No. 674,981. Patented May 28, 1901.
E. C. PARHAM.
CONTROLLING ELECTRIC MOTORS.
(Application filed Sept. 23, 1899.)
(No Model.)
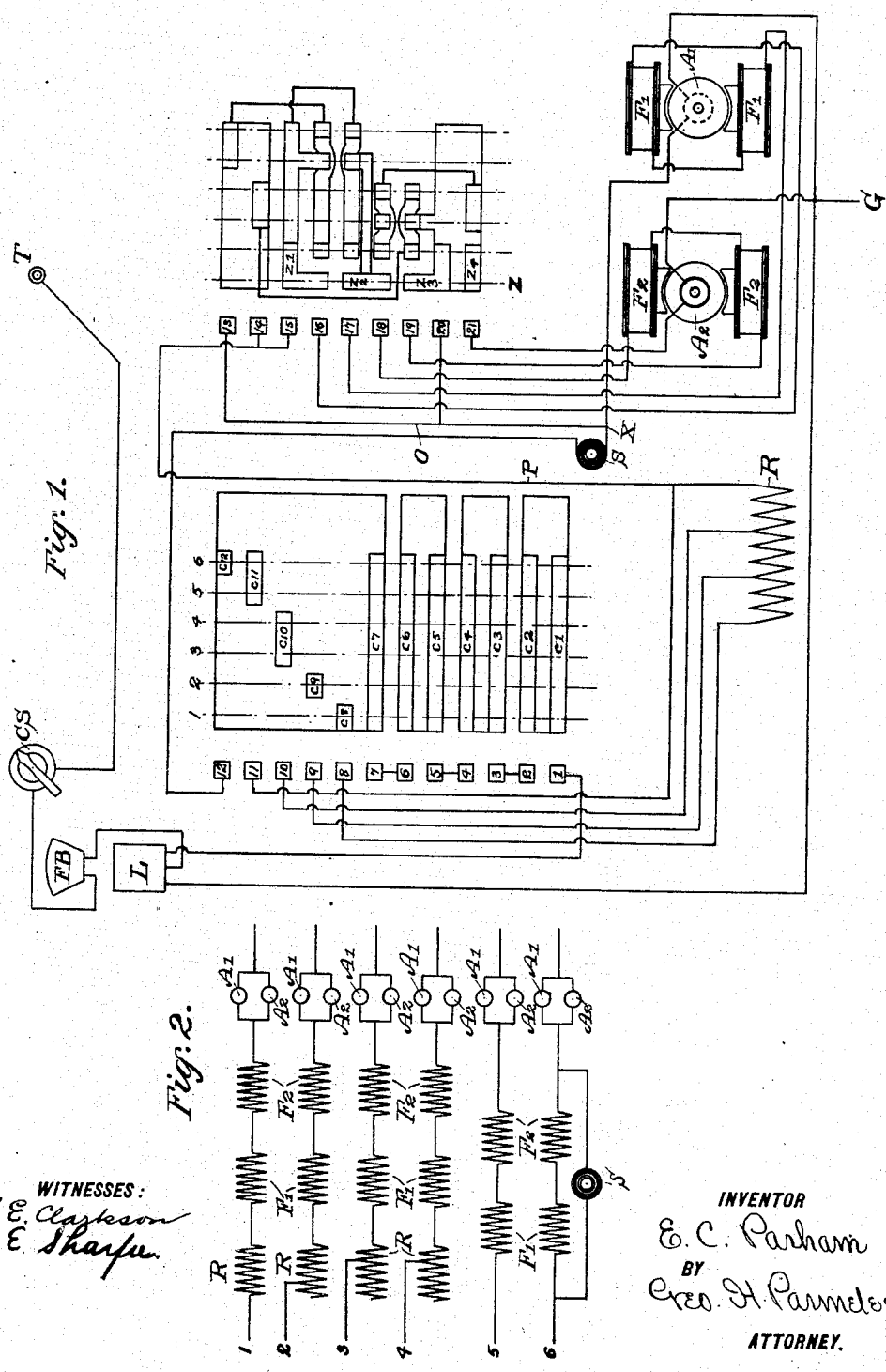
WITNESSES:
S. E. Clarkson
M. E. Sharpe
INVENTOR
E. C. Parham
BY
Geo. H. Parmelee
ATTORNEY.
THE NORRIS PETERS CO., PHOTO-LITHO., WASHINGTON, D. C.

UNITED STATES PATENT OFFICE.

EUGENE C. PARHAM, OF BROOKLYN, NEW YORK, ASSIGNOR TO THE LORAIN STEEL COMPANY, OF PENNSYLVANIA.

CONTROLLING ELECTRIC MOTORS.

SPECIFICATION forming part of Letters Patent No. 674,981, dated May 28, 1901.

Application filed September 23, 1899. Serial No. 731,477. (No model.)

*To all whom it may concern:*

Be it known that I, EUGENE C. PARHAM, of the borough of Brooklyn, city of New York, in the county of Kings and State of New York, have invented new and useful Improvements in Controlling Electric Motors, of which the following is a full, clear, and exact description, reference being had to the accompanying drawings, which form a part of this specification.

My invention has relation to means for the control of electric motors, and more particularly for motors used on electrically-propelled vehicles, although the invention can be readily adapted to any stationary work where its advantages, as hereinafter set forth, are desirable.

The object of my invention is to provide means for the control of a plurality of electric motors in such a manner as to retain many of the advantages of the well-known series-parallel system without certain defects and disadvantages inherent in such system. For instance, in that system the changes from series to parallel are of a nature to and do cause violent changes in the current taken from the line, introducing inductive discharges, which jeopardize the life of the motor by breaking down its insulation and causing grounds and crosses, which not only delay traffic, but increase largely the cost of maintenance, as well as the first cost of the motors, which must be constructed with this defect in view. Further, the changes from series to parallel cause a temporary increase in current, which exceeds to a considerable degree the amount required to run the car and requires a larger station capacity and circuit-breaker output than would otherwise be necessary. Again, the reactive effect between motors in series is such that if one motor gets to slipping it so much reduces the current which flows through both motors that the motor which does not slip has not current enough to produce the torque necessary to move the car, so that oftentimes the motors must be carried over to parallel position before the car will move. This not only causes an abnormal temporary increase in current, but it wrenches the motor-gearing and lessens its period of usefulness.

My invention consists in means for the control of two or more motors whereby they may be started from a position of rest with their fields connected in series with each other, but with their armatures in parallel, thereby giving to each field the entire current of the car, which not only augments the speed power of the motors, but restrains the tendency of one pair of wheels to slip by reason of the fact that the speed of the slipping wheel is regulated by the current passing through the other motor or motors.

The invention also provides suitable switch mechanism for maintaining this relation of the motors throughout the entire range of the index and also for connecting into the motor-circuit artificial resistance for regulating the speed and acceleration of the motors.

The invention also consists in the novel construction and combination of parts, all as hereinafter described, and pointed out in the appended claims.

In the accompanying drawings, Figure 1 is a diagrammatic development of the controlling and reversing switches, the motors, the car-wiring, and electrical connections; and Fig. 2 is a view showing diagrammatically the circuit relations at each of the said positions of the controlling-switch.

In the diagram Fig. 1, T designates the trolley; C S, the canopy-switch; F B, the fuse-box, and L the lightning-arrester, arranged in any well-known or suitable manner.

R indicates a resistance or starting-coil; S, a field shunt-coil; $A'$ $A^2$, the armature-coils of the two motors; $F'$ $F^2$, the respective field-coils, and G the ground connection.

The controlling-switch (shown at the left-hand side of the diagram) is in general of a well-known type, consisting of a rotary cylinder having upon its peripheral surface a plurality of contact-plates for engagement with fixed contact-fingers. In the present controller there are four groups of contacts, all the contacts of one group being electrically connected with each other, but disconnected electrically from the contacts of the other groups. In one group are the contacts $c'$ $c^2$, in a second group the contacts $c^3$ $c^4$, in a third group the contacts $c^5$ $c^6$, and in the fourth group the contacts $c^7$ to $c^{12}$, inclusive. The contacts $c'$ to $c^6$, inclusive, are long contacts, which remain in connection with their respective contact-fingers during the whole of the six indicated positions of the controller, serving simply as arc-subdividing connections to carry the current to the contacts of the fourth group, which are shorter and effect the hereinafter-described changes in the circuit conditions.

The numerals 1 to 12, inclusive, indicate the fixed contact-fingers, which engage the respective contact-plates.

The reversing-switch (shown at the right-hand side of the diagram) is also of well-known type, having six different positions. This switch is shown simply for the purpose of completing the electrical connections, and in tracing out the same hereinafter it will be assumed that the contact-fingers 13 to 21, inclusive, are in the first "go-ahead" position, involving the employment of the contacts $z'$ $z^2$ $z^3$ $z^4$ on the vertical line Z. The current passes from the trolley through the canopy-switch, fuse-box, and lightning-arrester to the contact-finger 1 of the controlling-switch. Contact-fingers 2 and 3 are electrically connected; so are fingers 4 and 5 and also 6 and 7. Fingers 8, 9, and 10 are electrically connected, respectively, to different portions of the resistance R. Finger 12 is connected to the armature $A'$ through the shunt-coil S. Finger 13 is also connected to said armature, but not through the said coil. Fingers 14 and 15 are connected to the resistance R by wire P, to which wire finger 11 is also connected. Finger 16 is connected to finger 17 through field-coils $F'$. Finger 18 is connected to finger 19 through the field-coils $F^2$. Finger 20 is connected to the armature $A'$ and finger 21 to armature $A^2$, from which connection is made to the ground or return side of the circuit.

Assuming the contact-fingers $c'$ to $c^{12}$ to be in position No. 1, the path of the current is as follows: From the trolley through the car instruments to finger 1, contacts $c'$ $c^2$, fingers 2 and 3, contacts $c^3$ $c^4$, fingers 4 and 5, contacts $c^5$ $c^6$, fingers 6 and 7, contact $c^7$, finger 8, resistance R, finger 15, contact $z'$, field-coils $F'$, finger 17, contact $z^2$, finger 18, field-coils $F^2$, finger 19, contacts $z^3$ and $z^4$, (these two contacts being electrically connected.) At this point the current divides, one part going by finger 20 and connection O to armature $A'$ and thence to ground, and the other part by finger 21, through armature $A^2$, to ground. From this it will be seen that the current passes through the resistance and through the field-coils of both motors in series and through the armatures of the two motors in parallel.

When the controller-lever is moved to position No. 2, the circuit is the same as before except that finger 8 loses its engagement with contact $c^8$ and finger 9 engages contact $c^9$. The only change which this effects is to cut out a portion of the resistance R.

In the third position finger 9 has moved off the contact $c^9$ and finger 10 has engaged contact $c^{10}$, thereby cutting out still more of the resistance. No other changes are effected.

In the fourth position finger 10 still engages contact $c^{10}$ and the circuit relations are precisely the same as in position No. 3. This position might be omitted, being introduced for the purpose of making the motorman retain the resistance in circuit longer than he intends to reduce the current jump in passing to position No. 5, in which all the resistance is cut out. In this position the finger 10 has left contact $c^{10}$ and finger 11 has engaged the contact $c^{11}$.

In position No. 6, which is the final position, the finger 11 is still engaged with the contact $c^{11}$ and finger 12 engages contact $c^{12}$. The current therefor divides between the fingers 11 and 12, one part passing from finger 11 through the fields in series by the path above indicated and the other part passing from finger 12 to shunt-coil S, the two branches of the circuit meeting at the point X and passing through the two armatures in multiple, as before. The one shunt, it will be seen, serves for both motors.

The method of control above described may not be as economical on the lower speeds as the series-parallel system, because the starting-coil constitutes the greater part of the resistance in circuit; but when it is taken into consideration that the series-parallel control usually employs resistance at several notches or positions, that that system is seldom used to its greatest advantage, owing to ignorant or careless handling, and that on long runs the series positions are seldom used; that its first cost is considerably greater, that the present system prevents the destruction of insulation due to inductive discharges in passing from series to parallel and also the wear of the car-wheels and truck from constant slippage, and that it requires a less maximum output of current, the present system is on the whole the more economical one.

I do not limit myself to the particular series of steps which I have herein shown and described, as various modifications may be employed without departing from the spirit and scope of my invention; nor do I limit myself to the use of the particular controller which I have herein shown and described, it being obvious that various forms of controllers may be devised which will operate to obtain the advantages of my invention.

Having thus described my invention, what I claim, and desire to protect by Letters Patent, is—

1. Apparatus for the control of electric motors, consisting in the combination with the motors, of artificial resistance for connection in series therewith, a shunt-coil for connection in multiple with the field-coils thereof and a controlling-switch having contacts and connections arranged to start the motors from a state of rest with their fields connected in series with each other and the artificial resistance and their armatures connected in multiple with each other and in series with the field-coils, and subsequently by further movement of the switch, to gradually remove said resistance and then connect the shunt-coil in multiple with the fields.

2. Apparatus for the control of electric motors, consisting in the combination with the motors, and a shunt-coil for connection in multiple with the field-coils thereof, of a controlling-switch having contacts and connections arranged to start the motors from a state of rest with their fields connected in series and their armatures connected in multiple with each other and in series with the fields, and to subsequently connect the shunt-coil in multiple with the fields, while retaining the said relations of the armatures and fields.

3. Apparatus for the control of electric motors, consisting in the combination with the motors, and a shunt-coil for connection in multiple with the field-coils thereof, of a controlling-switch having contacts and connections arranged to start the motors from a state of rest with their fields connected in series and their armatures connected in multiple with each other and in series with the fields, and to subsequently connect the shunt-coil in multiple with the series-connected fields of all the motors while retaining the said relation of the armatures to each other and to the fields.

4. The combination with a plurality of electric motors, artificial resistance for connection in series with the fields of said motors, and a shunt-coil for connection in multiple with said fields, of a controlling-switch having contacts and connections whereby in one position thereof the field-coils of the two motors are connected in series with each other and with the resistance, and upon further movement said resistance is gradually removed from the circuit and finally the shunt-coil is connected in multiple with the said fields.

5. The combination with a plurality of electric motors, artificial resistance for connection in circuit therewith and a shunt-coil, of a controlling-switch having contacts and connections for starting the motors with their fields all connected in series and their armatures in multiple with each other and in series with the fields, and for maintaining such connections throughout its range of movement, and also contacts and connections for inserting in and removing from circuit the said resistance and shunt-coil.

In testimony whereof I have affixed my signature in presence of two witnesses.

EUG. C. PARHAM.

Witnesses:
JOHN J. GILLESPIE,
W. F. CROFTON.